United States Patent
Sweeney et al.

(10) Patent No.: US 9,335,479 B2
(45) Date of Patent: May 10, 2016

(54) RESONATOR WITH REDUCED LOSSES

(71) Applicant: ASTRIUM LIMITED, Stevenage (GB)

(72) Inventors: Stephen Sweeney, Stevenage (GB); Yaping Zhang, Stevenage (GB)

(73) Assignee: ASTRIUM LIMITED, Hertfordshire (GB)

( * ) Notice: Subject to any disclaimer, the term of this patent is extended or adjusted under 35 U.S.C. 154(b) by 0 days.

(21) Appl. No.: 14/351,833

(22) PCT Filed: Oct. 9, 2012

(86) PCT No.: PCT/EP2012/069957
§ 371 (c)(1),
(2) Date: Apr. 14, 2014

(87) PCT Pub. No.: WO2013/053700
PCT Pub. Date: Apr. 18, 2013

(65) Prior Publication Data
US 2015/0124251 A1    May 7, 2015

(30) Foreign Application Priority Data

Oct. 14, 2011 (EP) .................... 11275126

(51) Int. Cl.
*G01J 3/28* (2006.01)
*G02B 6/293* (2006.01)
(Continued)

(52) U.S. Cl.
CPC .......... *G02B 6/29389* (2013.01); *G01J 3/0205* (2013.01); *G01J 3/26* (2013.01); *G01J 3/42* (2013.01); *G02B 5/22* (2013.01); *G02B 6/29341* (2013.01)

(58) Field of Classification Search
CPC ................ G01J 3/02; G01J 3/10; G01J 3/28; G01J 3/2803; G01J 3/2823
USPC .................................... 356/300–445
See application file for complete search history.

(56) References Cited

U.S. PATENT DOCUMENTS 5,786,303 A * 7/1998 Mansour .................... 505/210
6,633,696 B1 10/2003 Vahala et al.
(Continued)

FOREIGN PATENT DOCUMENTS

GB         2 470 155 A      11/2010
WO    WO 2007/014218 A2    2/2007

OTHER PUBLICATIONS

International Search Report (PCT/ISA/210) mailed on Jan. 7, 2013, by the European Patent Office as the International Searching Authority for International Application No. PCT/EP2012/069957.
(Continued)

*Primary Examiner* — Abdullahi Nur
(74) *Attorney, Agent, or Firm* — Buchanan Ingersoll & Rooney PC

(57) ABSTRACT

A device for detecting electromagnetic radiation comprises a waveguide and at least one resonator on a substrate, and a low-refractive index region between each resonator and the substrate. The low-refractive index region has a lower refractive index than a material of the resonator. The low-refractive index region may be annular, and may have a width corresponding to a width of a region in which electromagnetic radiation is concentrated in a whispering-gallery resonant mode. The low-refractive index region may be an air gap between the substrate and the resonator. The device may be a spectrometer for detecting a plurality of predetermined wavelengths of electromagnetic radiation.

13 Claims, 3 Drawing Sheets

(51) Int. Cl.
*G01J 3/42* (2006.01)
*G01J 3/26* (2006.01)
*G01J 3/02* (2006.01)
*G02B 5/22* (2006.01)

(56) References Cited

U.S. PATENT DOCUMENTS

| | | | |
|---|---|---|---|
| 6,865,314 | B1 | 3/2005 | Blair et al. |
| 2001/0004411 | A1 | 6/2001 | Yariv |
| 2002/0122615 | A1 | 9/2002 | Painter et al. |
| 2002/0180569 | A1* | 12/2002 | Mongia ............... 333/204 |
| 2003/0035120 | A1* | 2/2003 | Myatt et al. ............. 356/519 |
| 2003/0132820 | A1* | 7/2003 | Shamsaifar et al. ....... 333/205 |
| 2005/0135721 | A1 | 6/2005 | Painter et al. |
| 2005/0135764 | A1 | 6/2005 | Painter et al. |
| 2005/0207699 | A1 | 9/2005 | Painter et al. |
| 2006/0039653 | A1 | 2/2006 | Painter et al. |
| 2007/0025409 | A1 | 2/2007 | Yang et al. |
| 2009/0220228 | A1 | 9/2009 | Popovic |
| 2011/0273709 | A1 | 11/2011 | Sweeney |

OTHER PUBLICATIONS

Written Opinion (PCT/ISA/237) mailed on Jan. 7, 2013, by the European Patent Office as the International Searching Authority for International Application No. PCT/EP2012/069957.

International Search Report (PCT/ISA/210) mailed on Jan. 4, 2013, by the European Patent Office as the International Searching Authority for International Application No. PCT/EP2012/069928.

Written Opinion (PCT/ISA/237) mailed on Jan. 4, 2013, by the European Patent Office as the International Searching Authority for International Application No. PCT/EP2012/069928.

International Search Report (PCT/ISA/210) mailed on Jan. 16, 2013, by the European Patent Office as the International Searching Authority for International Application No. PCT/EP2012/069955.

Written Opinion (PCT/ISA/237) mailed on Jan. 15, 2013, by the European Patent Office as the International Searching Authority for International Application No. PCT/EP2012/069956.

International Search Report (PCT/ISA/210) mailed on Mar. 13, 2013, by the European Patent Office as the International Searching Authority for International Application No. PCT/EP2012/069934.

Written Opinion (PCT/ISA/237) mailed on Mar. 13, 2013, by the European Patent Office as the International Searching Authority for International Application No. PCT/EP2012/069934.

International Search Report (PCT/ISA/210) mailed on Mar. 13, 2013, by the European Patent Office as the International Searching Authority for International Application No. PCT/EP2012/069935.

Written Opinion (PCT/ISA/237) mailed on Mar. 13, 2013, by the European Patent Office as the International Searching Authority for International Application No. PCT/EP2012/069935.

Written Opinion issued in corresponding Singapore patent application No. 11201401491Q mailed Aug. 14, 2015, 11 pages.

\* cited by examiner

RESONATOR WITH REDUCED LOSSES

FIELD OF THE INVENTION

The present invention relates to reducing losses in resonators. More particularly, the present invention relates to a device comprising a resonator on a substrate, and a low-refractive index region between the substrate and the resonator.

BACKGROUND OF THE INVENTION

Spectrometers are used in many applications for measuring properties of light across a range of wavelengths. For example, a spectrometer can be used for compositional analysis, by obtaining absorption or emission spectra for an object of interest. The presence and location of peaks within the spectra can indicate the presence of particular elements or compounds. Spectrometers are commonly used for analysis at optical wavelengths, but can also be used at other wavelengths such as microwave and radio wavelengths.

Spectrometers are typically relatively complex and expensive devices that require the alignment of a number of moving parts to be controlled with high precision. For example, a typical spectrometer may focus light onto a diffraction grating to split an incident beam into separate wavelengths, and the diffraction grating may be rotated to a specific angle to direct light of a particular wavelength towards a detector. In recent years chip-based spectrometers have been developed which can be highly miniaturised, have no moving parts, and can be manufactured using well-established lithography techniques.

A typical chip spectrometer, which may also be referred to as a spectrometer-on-a-chip, comprises a substrate onto which are patterned a waveguide and a plurality of disk resonators coupled to the waveguide. The waveguide guides the input light to the disk resonators. Light is input to one end of the waveguide, and each resonator is arranged to support a resonant mode at a particular wavelength such that only light of that wavelength is coupled into the resonator. On top of each disk resonator is an electrode for detecting current that is proportional to the amount of light present in that resonator. The current detected in each resonator therefore indicates the amount of light at that wavelength that was present in the input beam of light. Each electrode is further connected to a signal bond pad for connecting the spectrometer to an external device for measuring the current.

SUMMARY OF THE INVENTION

According to the present invention, there is provided a device for detecting electromagnetic radiation, the device comprising a substrate, at least one resonator on the substrate, each resonator being resonant at a predetermined wavelength of the electromagnetic radiation, a waveguide on the substrate, coupled to the at least one resonator for guiding the electromagnetic radiation to the at least one disk resonator, and a low refractive index region between each resonator and the substrate, the low refractive index region having a lower refractive index than a material of the resonator.

Each resonator may be configured to support a whispering gallery resonant mode in which electromagnetic radiation of the predetermined wavelength is concentrated in a region adjacent to the resonator circumference, and the low refractive index region for each resonator may have a width corresponding to a width of the region in which the electromagnetic radiation is concentrated.

The low refractive index region may be an air gap between the resonator and the substrate.

The device may further comprise a support layer on the substrate, supporting the resonator and laterally adjacent to the air gap.

The substrate and the support layer may both be formed of Indium Phosphide (InP).

The device may further comprise an etch stop layer on the substrate, between the substrate and the low refractive index region.

The low refractive index region may comprise a dielectric layer between the resonator and the substrate.

The resonator may include a first cladding layer having a first band gap, an absorbing layer over the first cladding layer, and a second cladding layer having a second band gap and disposed over the absorbing layer, wherein the absorbing layer may have a lower band gap than the first and second band gaps, the band gap of the absorbing layer being selected so that electromagnetic radiation coupled into the resonator is absorbed in the absorbing layer, and wherein the low refractive index region may be disposed between the substrate and the first cladding layer and adjacent to the first cladding layer.

The low refractive index region may be annular.

The device may be a spectrometer for detecting a plurality of predetermined wavelengths of electromagnetic radiation, and may comprise a plurality of resonators each configured to be resonant at a different one of the plurality of predetermined wavelengths.

The waveguide may be disposed laterally adjacent to the at least one resonator and side-coupled to the at least one resonator.

The waveguide may be connected to the at least one resonator.

According to the present invention there is also provided the use of a low-refractive index region between a resonator and a substrate to reduce losses from the resonator in a device comprising the substrate, the resonator on the substrate, and a waveguide on the substrate coupled to the resonator for guiding the electromagnetic radiation to the resonator, the resonator being resonant at a predetermined wavelength of electromagnetic radiation and the low refractive index region having a lower refractive index than a material of the resonator.

BRIEF DESCRIPTION OF THE DRAWINGS

Embodiments of the present invention will now be described, by way of example only, with reference to the accompanying drawings, in which.

DETAILED DESCRIPTION

Figure 1:
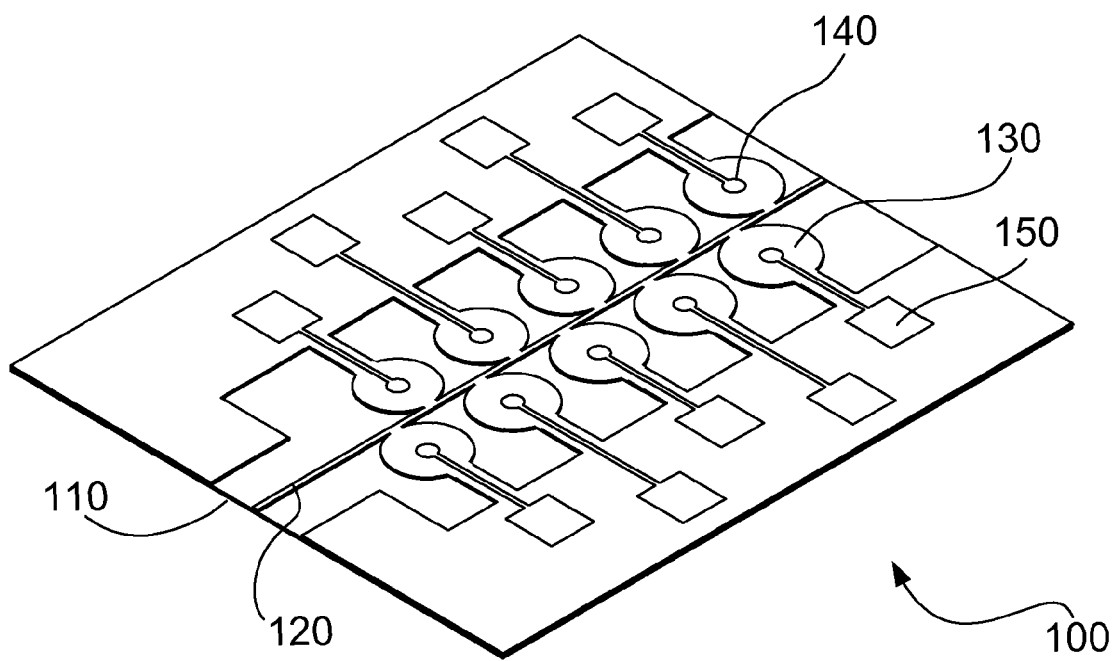
FIG. 1 illustrates a spectrometer according to an embodiment of the present invention.
Figure 2:
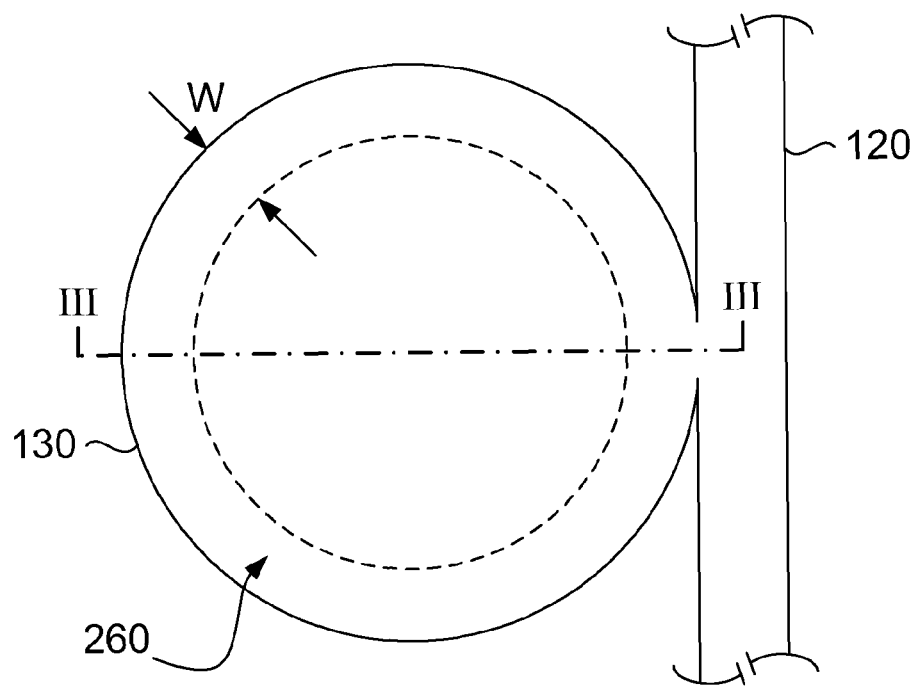
FIG. 2 illustrates a disk resonator in the spectrometer of FIG. 1.
Figure 3:
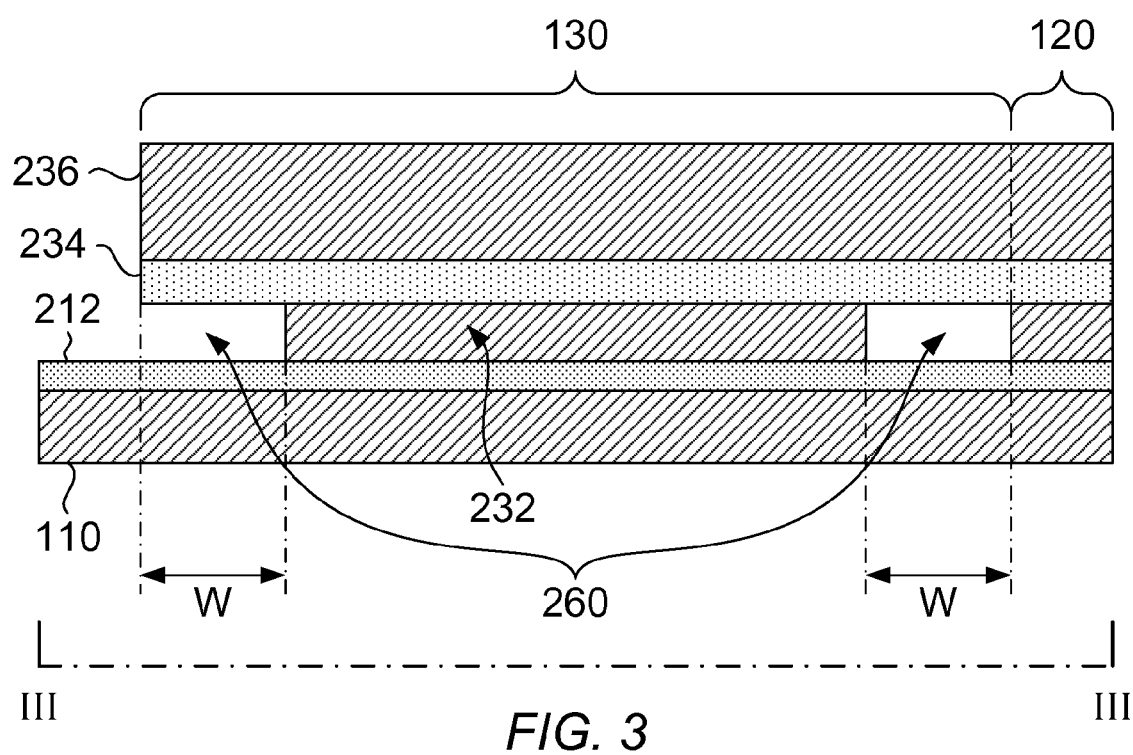
FIG. 3 is a cross-sectional view of the disk resonator of FIG. 2.

Referring now to FIGS. 1, 2 and 3, a disk resonator in a spectrometer is illustrated according to an embodiment of the present invention. As shown in FIG. 1 the spectrometer 100 is a spectrometer-on-a-chip, comprising a substrate 110, elongate waveguide 120, and a plurality of disk resonators 130 coupled to the waveguide. As shown in FIG. 1, the waveguide 120 and the disk resonators 130 are laterally adjacent on the substrate 110, the waveguide 120 being side-coupled to each of the disk resonators 130. Side-coupling may also be referred to as horizontal coupling or lateral coupling. In another embodiment the waveguide is vertically-coupled to the disk resonators, the waveguide being disposed above or below each resonator on the substrate. In any embodiment the waveguide can be connected to the resonators or can be spaced apart from the resonators.

Each disk resonator 130 is provided with an electrode 140 for sensing a current in the disk resonator, the electrode 140 being connected to a bond pad 150 for connecting the spectrometer 100 to other components. One of the disk resonators 130 is shown in plan view in FIG. 2, and FIG. 3 shows a cross-section along the line III-III of FIG. 2. The drawings are schematic, and provided for illustrative purposes only. In particular, other layers and components may be present, but have been omitted in FIGS. 2 and 3 for clarity. For instance, additional layers of metallisation may be deposited above and below the disk resonator as electrical contacts, to measure a current flowing in the disk resonator that is representative of the amount of light energy currently being coupled into the resonator.

Like the conventional chip-based spectrometer, in the present embodiment the elongate waveguide 120 is coupled to the disk resonator 130 to guide input light to the disk resonator 130. The disk resonator 130 is configured to support a resonant mode at a particular predetermined wavelength of light, such that only light of the predetermined wavelength is coupled from the waveguide 120 into the disk resonator 130. However, unlike a conventional spectrometer in which the waveguide and disk resonators are deposited directly onto the substrate, in the present embodiment a low-refractive index region 260 is disposed between the disk resonator 130 and the substrate 110.

In more detail, in a chip-based spectrometer such as the one shown in FIG. 1, the waveguide may be integrally formed with the resonators. It may be formed on the substrate in the same processing step as the resonators and from the same material, such as a suitable semiconductor material. The substrate may also be manufactured from a suitable semiconductor material. For example, the substrate may be formed from n-doped Indium Phosphide (InP). The waveguide and the resonators are provided as one or more layers on top of the substrate. On top of the one or more layers forming the waveguide and resonators there may be formed a capping layer, to reduce losses caused by light escaping from the upper surface of the resonators and waveguide. There may also be provided an isolation layer for metallisation on top of the capping layer. Here, when a layer is referred to as being deposited on top of another layer, this does not exclude the possibility that other intervening layers may also be present. In particular, in the present embodiment an etch-stop layer is formed on top of the substrate, allowing a support layer at the base of the disk resonators to be partially etched to form the low-refractive index region. The structure of a disk resonator is illustrated in more detail in FIGS. 2 and 3.

With reference to FIG. 3, in the present embodiment the disk resonator has a multilayer structure including a support layer 232, an active region 234, and a capping layer 236. The substrate is formed from InP that is n-doped with a dopant concentration of about $1-3\times10^{18}$ cm$^{-3}$. The support layer 232 is also formed from n-doped InP, having a dopant concentration of about $4-6\times10^{17}$ cm$^{-3}$. In the present embodiment, the active region 234 has a multilayer structure including first and second cladding layers for guiding light in the resonator 230, and an absorbing layer between the first and second cladding layers. The first and second cladding layers are each formed from undoped InGaAsP, and each have a thickness of 0.2485 µm. The cladding layers ensure that the optical field is at a maximum over the absorbing layer, to maximise absorption. In some embodiments, the absorbing layer may be a quantum well. The absorbing layer may be grown by molecular beam epitaxy or chemical vapour deposition which can control the layer thickness down to monolayers. The absorbing layer can be sufficiently thin to have little or no influence on the optical field in the waveguide, for example may have a thickness of about 3 nm. The capping layer 236 is formed from p-doped InP having a dopant concentration of about $2\times10^{18}$ cm$^{-3}$.

It will be appreciated that the present invention is not limited to these particular materials and thicknesses, and in other embodiments other structures may be used. For instance, in some applications it may be required to integrate the device with other on-chip components, which may constrain the choice of materials for the substrate. Other materials can also be chosen for the other layers, to provide compatibility with the substrate, e.g. to provide lattice-matching to the substrate.

As shown in FIG. 3, in the present embodiment the resonators and waveguide have the same layer structure. However, it will be appreciated that the structure does not have to be uniform across the resonators and the waveguide. For example, the absorbing layer may be provided only in the resonators, and not in the waveguide. To achieve this, the absorbing layer in the waveguide can be selectively etched and replaced by a wider band-gap alloy or the absorbing layer can only be deposited in the disk resonators in the first place.

The one or more layers in the active region 234 may have a higher refractive index than the support layer 232 and the capping layer 236, so that light is guided in the active region 234 due to the refractive index contrast between the layers forming the active region 234 and the support layer 232 and capping layer 236. It should be realised that the layer structure described above is just an example and one or more layers may be removed or replaced. It should also be realised that the support layer can be omitted in some embodiments, for example the resonator can be supported on the low-refractive index region if this is formed from a solid material such as dielectric, as opposed to being an air gap. In this case, the light is guided in the active region by the refractive index contrast between the layers of the active region, and the capping layer and low-refractive index region.

In general, the capping layer and support layer may have band gaps that are greater than the highest-energy photon of interest, i.e. greater than the energy of a photon at the shortest wavelength that the spectrometer is configured to detect. This ensures that light is not absorbed in the capping and support layers.

In contrast to the support layer 232 and capping layer 236, the absorbing layer in the active region 234 has a band gap that is less than the lowest-energy photon of interest, i.e. lower than the energy of a photon at the longest wavelength that the spectrometer is configured to detect. In this way, the same composition of the absorbing layer can be used in all disk resonators in the spectrometer. This ensures that light in the resonator 130 can be absorbed by the absorbing layer. Specifically, when light of the predetermined wavelength enters the resonator 130 from the waveguide 120, it circulates many times in the resonator 130. The optical path length in the disk resonator 130 is therefore substantially longer than the optical path length in the waveguide 120, ensuring that light can be absorbed in the resonator 130 even when the quantum-well absorbing layer has a low absorption coefficient, for example due to its low thickness. The photons can be absorbed by the material in the absorbing layer as the band gap is sufficiently low for even the lowest-energy photons to excite electrons from the valence band into the conduction band, generating electron-hole pairs. The resulting current can be measured, and is proportional to the amount of light energy in the disk resonator 130. Accordingly, the disk resonator 130 can be used to detect and measure an amount of light energy present at the predetermined wavelength in a light beam that is input to the waveguide 120. The present invention is not limited to the layer structure shown in FIG. 3, and in other embodiments other structures may be used.

As shown in FIGS. 2 and 3, in the present embodiment the low-refractive index region 260 is annular in shape and has a width W, and is disposed on the substrate 110 between the substrate 110 and the disk resonator 130. The low-refractive index region 260 is an air gap between the substrate 110 and the active region 234, that is formed by selectively etching the support layer 232, using an etchant that has a substantially higher etch rate for the material of the support layer 232 than for the materials of the active region 234 and capping layer 236. In the present embodiment, an etch-stop layer 212 is deposited on top of the substrate 110, between the substrate 110 and the support layer 232. This prevents etching of the substrate 110 when forming the air gap 260, since in the present embodiment the support layer 232 and substrate 110 are formed of similar material, i.e. n-doped InP. As an example, the etch-stop layer 212 may be formed from n-doped InGaAsP with a dopant concentration of $0.18$-$1.2 \times 10^{18}$ cm$^{-3}$ and the support layer may be formed from n-doped InP with a dopant concentration of $4$-$6 \times 10^{17}$ cm$^{-3}$.

Also, although in FIG. 3 the low-refractive index region is formed as an air gap, the present invention is not limited to this embodiment. In other embodiments, instead of an air gap, the low-refractive index region may be formed of another material, such as a dielectric, having a lower refractive index than an adjacent layer of the disk resonator, i.e. the layer to which the low-refractive index region is adjacent. In general, the low-refractive index region should have a refractive index that is lower than the refractive index of the adjacent layer of the disk resonator by an amount such that total internal reflection occurs at the boundary between the low-refractive index region and the disk resonator. In this way, the low-refractive index region can prevent light escaping from the lower surface of the disk resonator. Accordingly, scattering and absorption losses can be reduced in comparison to a conventional arrangement without a low-refractive index region. In addition, the low-refractive index region causes the optical mode in both the disk resonator and waveguide to be lifted in a vertical direction, further reducing leakage from the resonator and waveguide into the substrate, and reducing bending losses in the disk resonator.

The low-refractive index region is preferably disposed adjacent to the active region as shown in FIG. 3. In particular, if an active region including an absorbing layer between two cladding layers is used, the low-refractive index region is preferably disposed adjacent to the lower cladding layer. This can prevent light escaping from the active region, ensuring that a greater proportion of the light energy is absorbed in the absorbing layer and hence reducing losses.

In the present embodiment, the disk resonator 130 is supported on a support layer 232 which is disposed on the substrate 110 and is laterally adjacent to the air gap 260. The support layer 232 may be integral to the disk resonator, and may for example simply be a portion of the disk resonator that remains after partially etching material of the disk resonator below the active region 234. However, the present invention is not limited to this arrangement. For example, if the low-refractive index region is formed from a dielectric layer instead of an air gap, this dielectric layer may be uniformly deposited beneath the whole disk resonator. For instance, the dielectric layer could be uniformly deposited over the substrate, simplifying the fabrication process and removing the requirement for an etching step. In this case, the disk resonator can be supported on the dielectric layer comprising the low-refractive index region, and the support layer is not required.

Continuing with reference to FIG. 3, each disk resonator in the spectrometer has a diameter that is selected to support a pure whispering-gallery resonant mode at the predetermined wavelength which the resonator is configured to detect. A whispering-gallery resonant mode is a mode in which the light coupled into a resonator is concentrated in a region near the circumference of the disk resonator. Specifically, in a whispering-gallery resonant mode, most light energy in the disk resonator is concentrated in a region of width $W_1$, i.e. within a distance $W_1$ from the outer edge of the disk resonator. Therefore, the low-refractive index region 260 below a particular resonator may have a width W that is greater than or equal to substantially the width $W_1$ of the whispering-gallery resonant mode in that resonator.

Figure 4:
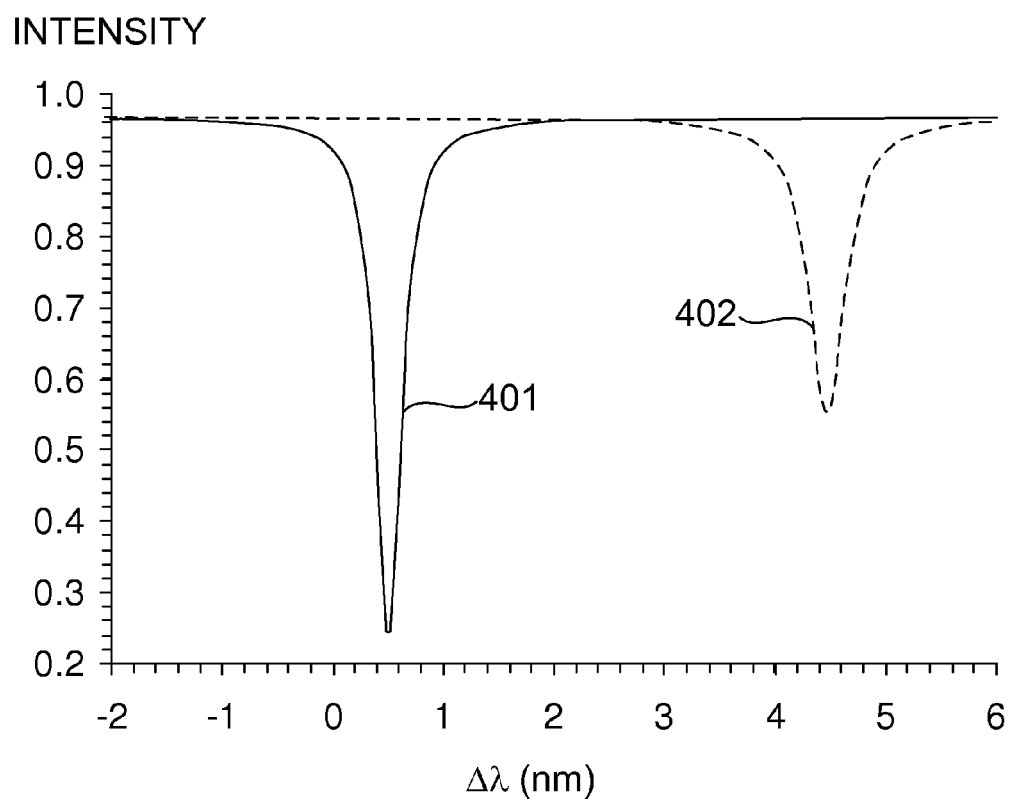
FIG. 4 is a graph comparing losses in the disk resonator of FIGS. 2 and 3 to losses in a conventional disk resonator.

FIG. 4 is a graph comparing losses in the disk resonator of FIGS. 2 and 3 to losses in a conventional disk resonator. In FIG. 4, the vertical axis represents intensity measured as the ratio of output/input. The input energy is the light energy input to the waveguide, and the output energy is the light energy that is the energy measured at the output of the waveguide. Therefore, a dip in the curve at a particular wavelength shows that light at that wavelength is coupled into, and absorbed by, the disk resonator. That is, when light at this particular wavelength is input to the input end of the waveguide, a substantial portion of the light does not reach the other end of the waveguide because it is absorbed by the resonator before it can reach the far end of the waveguide. A lower minimum in the curve indicates that more energy is absorbed in the resonator, i.e. a higher quality of resonance is achieved at that wavelength. In FIG. 4, the solid line 401 shows the intensity vs. wavelength for the disk resonator including the low-refractive index region shown in FIGS. 2 and 3. The dashed line shows intensity vs. wavelength for a conventional disk resonator without the low-refractive index region. As shown in FIG. 4, the use of a low-refractive index region reduces losses in the disk resonator by ensuring that more of the input energy is absorbed in the active layer.

Figure 5:
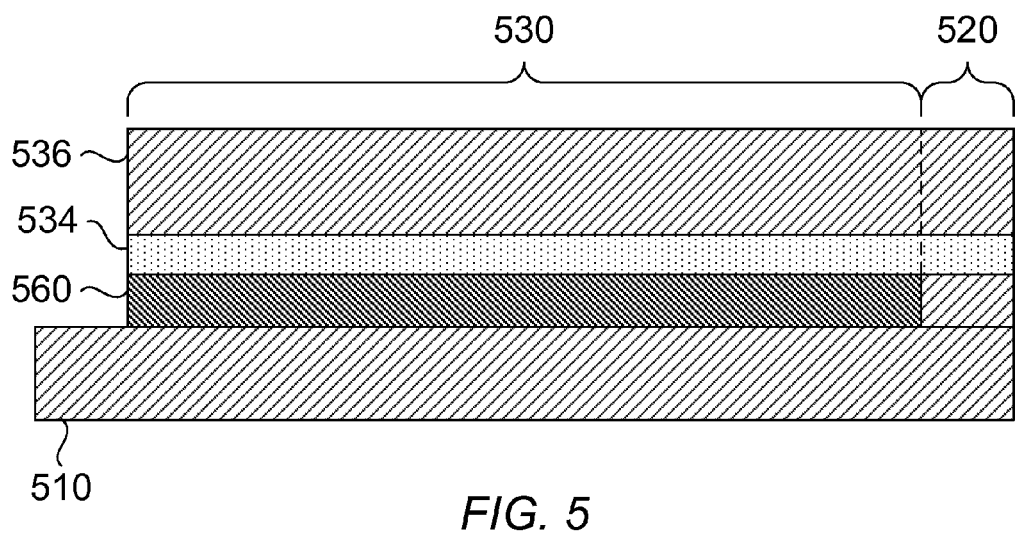
FIG. 5 illustrates a cross-section of a disk resonator, according to an embodiment of the present invention.

In the embodiment of FIGS. 2 and 3, the low-refractive index region is formed as an air gap. However, in other embodiments any material may be used that has a sufficiently low refractive index to cause total internal reflection at the boundary with the disk resonator. One alternative embodiment is shown in FIG. 5, which illustrates a waveguide 520 and disk resonator 530 on a substrate 510, the disk resonator 530 including an active layer 534 and a capping layer 536. These elements are substantially similar to the corresponding elements of the device shown in FIG. 3, and as such a detailed description will be omitted to maintain brevity.

The embodiment of FIG. 5 differs from the embodiment of FIG. 3 in that in the device of FIG. 5, the low-refractive index region is a dielectric layer 560. Here, the dielectric layer 560 may be formed of any material having a lower refractive index than an adjacent layer of the disk resonator 530, which in the present embodiment is the active layer 534. Although in FIG. 6 the dielectric layer 560 is a continuous layer between the disk resonator 530 and substrate 510, in other embodiments the dielectric layer may have a particular shape, for example may be annular as shown in FIG. 2. The etch stop layer of FIG. 3 is not required in this embodiment, and hence is omitted.

Whilst certain embodiments of the present invention have been described above, the skilled person will understand that many variations and modifications are possible without departing from the scope of the invention as defined in the accompanying claims.

Although embodiments of the present invention have been described in relation to a spectrometer for detecting a plurality of wavelengths of light, the present invention is not limited to such applications. Embodiments of the invention may be used to detect electromagnetic radiation of any wavelength. For example, a low-refractive index region may be provided for any disk resonator configured to support a resonant mode at wavelengths other than optical wavelengths. A disk resonator may be configured to be resonant at a microwave wavelength instead of an optical wavelength. Furthermore, embodiments of the present invention may find use in any device which includes one or more disk resonators, and not only in chip-based spectrometers. Low-refractive index regions such as those shown in FIGS. 2, 3 and 6 may be used in other types of device which include at least one resonator coupled to a waveguide. For instance, other embodiments of the present invention may find use in photonic integrated circuits, optical sensors, and devices for optical communications such as add-drop multiplexers. It will be appreciated that the resonators do not have to be disk resonators. The resonators can be any high Q cavities, such as spherical resonators, microrings etc.

It will further be appreciated that the spectrometer, with respect to which the invention has been described, may be considered to be, or form part of, a spectrophotometer. Therefore, where the term "spectrometer" has been used, the term could have been replaced with the term "spectrophotometer".

The invention claimed is:

1. A device comprising:
   a substrate;
   at least one resonator on the substrate, each resonator being resonant at a predetermined wavelength of electromagnetic radiation and configured to support a whispering gallery resonant mode in which electromagnetic radiation of the predetermined wavelength is concentrated in a region adjacent to a circumference of each resonator;
   a waveguide on the substrate, coupled to the at least one resonator for guiding the electromagnetic radiation to the at least one resonator; and
   a low refractive index region between each resonator and the substrate, the low refractive index region having a lower refractive index than a material of the resonator,
   wherein the low refractive index region for each resonator has a width corresponding to a width of the region adjacent to a circumference of each resonator in which the electromagnetic radiation is concentrated, and
   wherein the low refractive index region is an air gap between the resonator and the substrate.

2. The device of claim 1, comprising:
   a support layer on the substrate, supporting the resonator and laterally adjacent to the air gap.

3. The device of claim 2, wherein the substrate and the support layer are both formed of Indium Phosphide InP.

4. The device of claim 1, comprising:
   an etch stop layer on the substrate, between the substrate and the low refractive index region.

5. The device of claim 1, wherein the low refractive index region comprises:
   a dielectric layer between the resonator and the substrate.

6. The device of claim 1, wherein the resonator comprises:
   a first cladding layer having a first band gap;
   an absorbing layer over the first cladding layer; and
   a second cladding layer having a second band gap and disposed over the absorbing layer,
   wherein the absorbing layer has a lower band gap than the first and second band gaps, the band gap of the absorbing layer being selected so that electromagnetic radiation coupled into the resonator will be absorbed in the absorbing layer, and
   wherein the low refractive index region is disposed between the substrate and the first cladding layer and adjacent to the first cladding layer.

7. The device of claim 1, wherein the low refractive index region is annular.

8. The device of claim 1, wherein the device is a spectrometer for detecting a plurality of predetermined wavelengths of electromagnetic radiation, and
   wherein the device comprises:
   a plurality of resonators each configured to be resonant at a different one of the plurality of predetermined wavelengths.

9. The device of claim 1, wherein the waveguide is disposed laterally adjacent to the at least one resonator and is side-coupled to the at least one resonator.

10. The device of claim 1, wherein the waveguide is connected to the at least one resonator.

11. The device of claim 1, wherein the low refractive index region for each resonator as a width greater than or equal to the width of the region adjacent to a circumference of each resonator in which the electromagnetic radiation is concentrated.

12. A method for reducing losses from a resonator in a device having a substrate, the resonator being situated on the substrate, and a waveguide located on the substrate coupled to the resonator, the method comprising:
   guiding electromagnetic radiation to the resonator, the resonator being resonant at a predetermined wavelength of electromagnetic radiation;
   concentrating electromagnetic radiation of the predetermined wavelength in a region adjacent to a circumference of the resonator in a whispering gallery resonant mode; and
   reducing losses from the resonator via a low-refractive index region located between a resonator and the substrate, the low refractive index region having a lower refractive index than a material of the resonator and the low refractive index region for each resonator having a width corresponding to a width of the region adjacent to a circumference of each resonator in which the electromagnetic radiation is concentrated,
   wherein the low refractive index region is an air gap between the resonator and the substrate.

13. The method of claim 12, wherein the low refractive index region for each resonator has a width greater than or equal to the width of the region adjacent to a circumference of each resonator in which the electromagnetic radiation is concentrated.

* * * * *